United States Patent
Matrosov et al.

(10) Patent No.: US 12,474,905 B2
(45) Date of Patent: Nov. 18, 2025

(54) DETECTING VULNERABILITIES TO FAULT INJECTION IN COMPUTER CODE USING MACHINE LEARNING

(71) Applicant: NVIDIA Corporation, Santa Clara, CA (US)

(72) Inventors: Alexander Matrosov, Hillsboro, OR (US); Christopher Schneider, Fife (GB)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/177,311

(22) Filed: Oct. 31, 2018

(65) Prior Publication Data
US 2019/0370473 A1    Dec. 5, 2019

Related U.S. Application Data
(60) Provisional application No. 62/678,202, filed on May 30, 2018.

(51) Int. Cl.
*H04L 29/06* (2006.01)
*G06F 8/41* (2018.01)
(Continued)

(52) U.S. Cl.
CPC ............... *G06F 8/433* (2013.01); *G06F 8/75* (2013.01); *G06F 18/214* (2023.01); *G06F 21/54* (2013.01); *G06F 21/577* (2013.01); *G06N 20/00* (2019.01)

(58) Field of Classification Search
CPC ...... G06F 21/577; G06F 21/54; G06F 21/566; G06F 21/00; H04L 63/1433; H04L 63/145; H04L 63/20
(Continued)

(56) References Cited

U.S. PATENT DOCUMENTS
8,474,045 B2 * 6/2013 Kang ..................... G06F 21/54
726/25
8,683,269 B2 * 3/2014 Jackson ............... G06F 21/577
714/38.14
(Continued)

OTHER PUBLICATIONS
Goncharov, Konstantin, "Inspector Deep Learning has launched in beta," Riscure.com, at https://www.riscure.com/blog/inspector-deep-learning-launched-beta/, Oct. 13, 2017, Retrieved on Mar. 29, 2020, 5 pages.

*Primary Examiner* — Longbit Chai
(74) *Attorney, Agent, or Firm* — Davis Wright Tremaine LLP

(57) ABSTRACT

A code analyzer implements machine learning to detect vulnerabilities in computer code. The code analyzer trains a machine learning model using training vectors that characterize vulnerable programming patterns. The code analyzer evaluates a topological representation of the computer code using the machine learning model to identify a potential vulnerability. The potential vulnerability corresponds to a portion of the computer code where an attack can be used to bypass a security procedure. The code analyzer tests the potential vulnerability by emulating a fault injection during execution of the portion of the computer code. Upon confirming that the potential vulnerability can be exploited via a fault injection, the code analyzer generates a training vector that characterizes a vulnerable programming pattern associated with the portion of the computer code. The training vector can be used to further train the machine learning model.

26 Claims, 5 Drawing Sheets

(51) Int. Cl.
  *G06F 8/75* (2018.01)
  *G06F 18/214* (2023.01)
  *G06F 21/54* (2013.01)
  *G06F 21/57* (2013.01)
  *G06N 20/00* (2019.01)

(58) Field of Classification Search
  USPC .......................................................... 726/25
  See application file for complete search history.

(56) References Cited

U.S. PATENT DOCUMENTS

| | | | |
|---|---|---|---|
| 10,311,229 B1* | 6/2019 | Pohlack | G06F 9/45558 |
| 10,375,099 B2* | 8/2019 | Isola | H04L 63/1483 |
| 10,726,128 B2* | 7/2020 | Krasser | G06F 21/565 |
| 2019/0121979 A1* | 4/2019 | Chari | G06N 5/022 |

* cited by examiner

DETECTING VULNERABILITIES TO FAULT INJECTION IN COMPUTER CODE USING MACHINE LEARNING

CROSS-REFERENCE TO RELATED APPLICATIONS

This application claims priority benefit of the U.S. Provisional Patent Application titled, "DETECTION OF FAULT INJECTION USING UNSUPERVISED MACHINE LEARNING", filed on May 30, 2018 and having Ser. No. 62/678,202. The subject matter of this related application is hereby incorporated herein by reference.

BACKGROUND

Malicious individuals can implement various types of attacks in order to bypass security procedures implemented by conventional computer systems, thereby illicitly gaining access to sensitive data. For example, a malicious individual could implement a fault injection to bypass an authorization procedure implemented by a software application executing on a computer system. One step in the process of developing software applications is to identify vulnerabilities to attacks. Typically, a test engineer visually inspects the source code of a given software application to identify such vulnerabilities. However, visually inspecting an entire code base can take an exceedingly lengthy period of time. Furthermore, visually inspecting code can be very error-prone because test engineers may overlook vulnerabilities or fail to identify unknown vulnerabilities.

SUMMARY

Various embodiments include a computer-implemented method. The computer-implemented method includes generating a first machine learning model based on a first set of training data associated with a first type of vulnerability, generating a topology based on a first portion of code, wherein the topology comprises at least one of a control flow associated with the first portion of code or a data flow associated with the first portion of code, analyzing the topology based on the first machine learning model to determine that the first portion of code includes the first type of vulnerability, and performing one or more remedial operations in response to determining that the first portion of code includes the first type of vulnerability.

At least one technological advantage of the disclosed techniques is that vulnerabilities to fault injection can be automatically detected in computer code with greater effectiveness compared to conventional approaches.

BRIEF DESCRIPTION OF THE DRAWINGS

So that the manner in which the above recited features of the various embodiments can be understood in detail, a more particular description of some of the various embodiments may be had by reference to the appended drawings. It is to be noted, however, that the appended drawings illustrate only typical embodiments and are therefore not to be considered limiting of scope in any way, and that there are other equally effective embodiments.

DETAILED DESCRIPTION

Figure 1:
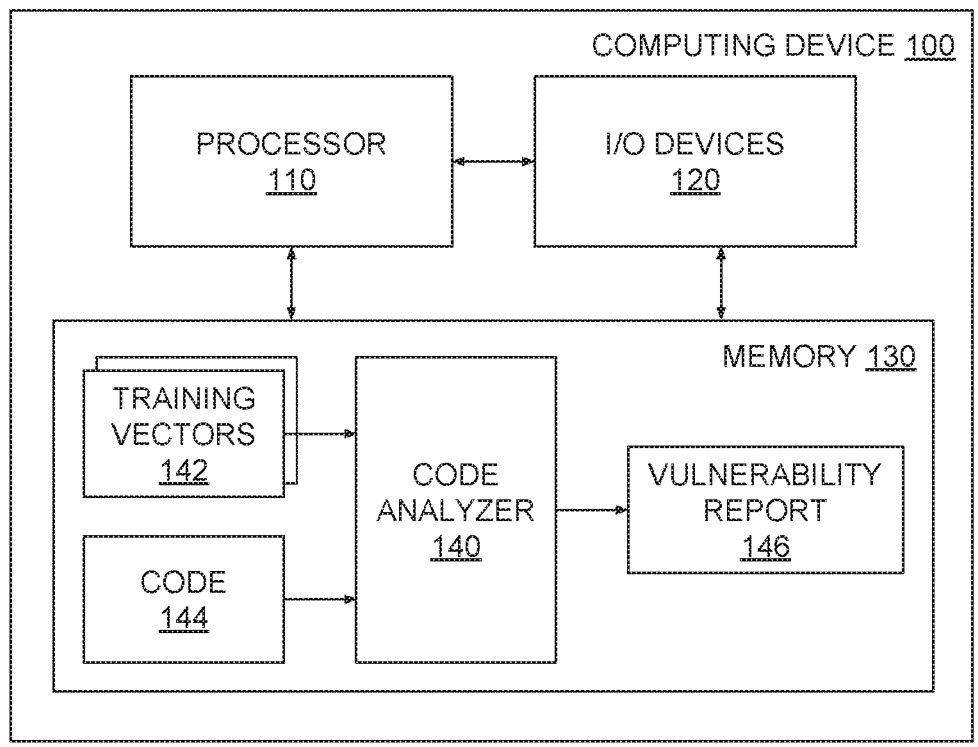
FIG. 1 illustrates a system configured to implement one or more aspects of various embodiments.

In the following description, numerous specific details are set forth to provide a more thorough understanding of the various embodiments. However, it will be apparent to one skilled in the art that the various embodiments may be practiced without one or more of these specific details.

Computer systems include one or more processors that execute various types of software and/or firmware applications. Software and/or firmware applications often implement various security procedures to securely provide access to sensitive data. Those security procedures may include an authentication routine, where the identity of a user is established, and an authorization routine, where the user is granted access to specific data. For example, a computer system could execute a secure boot firmware application in order to authenticate a user based on a username and password, and then authorize the user to access a specific set of encrypted files based on a set of permissions.

As noted above, malicious individuals can implement various types of attacks in order to bypass these security procedures, thereby illicitly gaining access to sensitive data stored on the computer system. One type of attack involves modifying the voltage level supplied to a processor in the computer system to cause the processor to skip certain portions of the above-described security procedures. Another type of attack involves focusing electromagnetic radiation on specific memory locations in the computer system to corrupt cryptologic primitives used to perform the security procedures. These two types of attack fall into a broad category known as "fault injection," and a more specific category known as "glitching attacks."

One step in the process of developing a given software or firmware application identifies vulnerabilities to attacks in the given software of firmware application. Typically, a test engineer visually inspects the source code of the software or firmware application to identify regions of the source code where voltage modifications, data corruption, and other types of injected faults could cause the security procedures to be bypassed.

Visually inspecting code to identify vulnerabilities is problematic for several reasons. First, a modern code base can include hundreds of thousands of lines of code. Consequently, visually inspecting the entire code base to identify all possible vulnerabilities can take a very long time. In addition, visually inspecting code to identify vulnerabilities if often very error-prone because test engineers frequently overlook vulnerabilities or fail to identify unknown vulnerabilities. Consequently, software and firmware applications are oftentimes deployed with unknown and/or unmitigated vulnerabilities that can be exploited to access sensitive data.

To address these issues, various embodiments include a code analyzer that implements machine learning to detect vulnerabilities in computer code. In one embodiment, the code analyzer trains a machine learning model using training vectors that characterize vulnerable programming patterns. The code analyzer evaluates a topological representation of the computer code using the machine learning model to identify a potential vulnerability. The potential vulnerability corresponds to a portion of the computer code where an attack can be used to bypass a security procedure. In one embodiment, the code analyzer tests the potential vulnerability by emulating a fault injection during execution of the portion of the computer code. Upon confirming that the potential vulnerability can be exploited via a fault injection, the code analyzer generates a training vector that characterizes a vulnerable programming pattern associated with the portion of the computer code. The training vector can be used to further train the machine learning model. In one embodiment, the code analyzer identifies vulnerabilities in computer code using the machine learning model while also training the machine learning model to better detect such vulnerabilities.

At least one technological advantage of the various embodiments is that vulnerabilities to attacks can be automatically detected in computer code with greater effectiveness compared to conventional approaches. Another technological advantage of the various embodiments is that a machine learning model trained to detect such vulnerabilities becomes more effective at detecting vulnerabilities over time. Yet another technological advantage of the various embodiments is that reliance on manual approaches to detecting vulnerabilities via visual inspection of code can be reduced or eliminated. These technological advantages represent multiple technological advancements relative to prior art approaches.

System Overview

FIG. 1 illustrates a system configured to implement one or more aspects of various embodiments. In the embodiment shown, a computing device 100 includes a processor 110, input/output (I/O) devices 120, and memory 130, coupled together. Processor 110 includes any technically feasible set of hardware units configured to process data and execute software applications. For example, processor 110 could include one or more central processing units (CPUs), graphics processing units (GPUs), field programmable gate arrays (FPGAs), hardware accelerators, and so forth. I/O devices 120 include any technically feasible set of devices configured to perform input and/or output operations, including, for example, a universal serial bus (USB) port, among others. Memory 130 includes any technically feasible storage media configured to store data and software applications, such as, for example, a hard disk and/or a random-access memory (RAM) module, among others. Memory 130 includes a code analyzer 140, training vectors 142, code 144, and vulnerability report 146.

In one embodiment, code analyzer 140 is a software application including program instructions that, when executed by processor 110, configures processor 110 to identify vulnerabilities to fault injection attacks within code 144 based on training vectors 142. Training vectors 142 characterize specific programming patterns known to cause vulnerabilities to fault injection attacks. Code 144 includes source code associated with a given software or firmware application and/or compiled binaries associated with a given software or firmware program. In this embodiment, vulnerability report 146 indicates vulnerabilities to fault injection attacks detected within code 144.

In one embodiment, during operation, code analyzer 140 processes training vectors 142 to generate a machine learning model (not shown here) for detecting vulnerabilities to fault injection attacks. Based on the trained machine learning model, code analyzer 140 analyzes code 144 to detect and test potential vulnerabilities to fault injection attacks. Code analyzer 140 then generates vulnerability report 146 to indicate specific portions of code 144 where fault injection attacks can cause security procedures to be bypassed. Code analyzer 140 further trains the machine learning model based on the vulnerabilities found within code 144, thereby improving the ability of the machine learning model to detect vulnerabilities in other code. Code analyzer 140 is described in greater detail below in conjunction with FIG. 2.

Detecting Fault Injection Vulnerabilities Via Machine Learning

Figure 2:
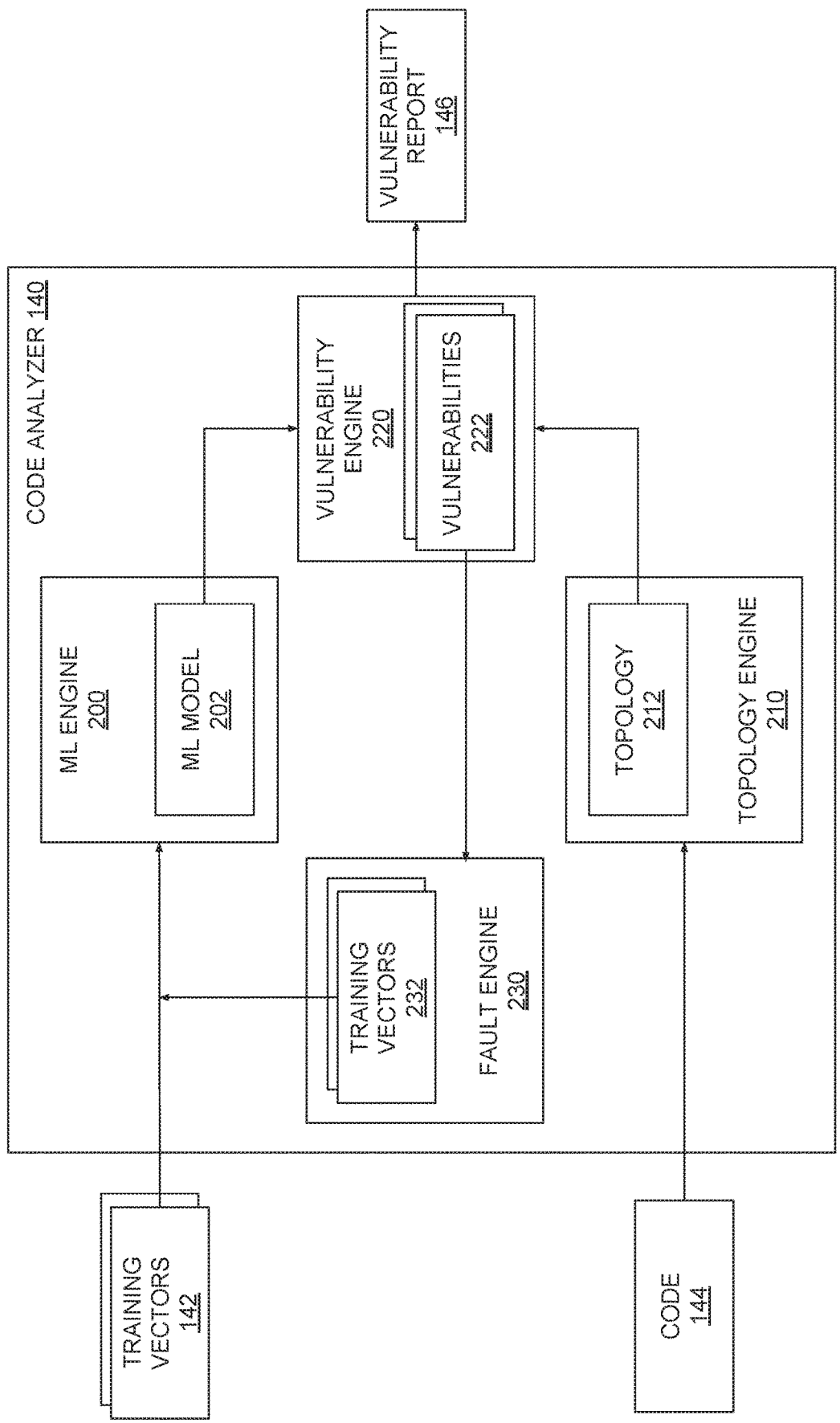
FIG. 2 is a more detailed illustration of the code analyzer of FIG. 1, according to various embodiments.

FIG. 2 is a more detailed illustration of the code analyzer of FIG. 1, according to various embodiments. In the embodiment shown, code analyzer 140 includes a machine learning (ML) engine 200, a topology engine 210, a vulnerability engine 220, and a fault engine 230. ML engine 200 is a software module configured to generate and train ML model 202 based on training vectors 142. ML model 202 can be any technically feasible form of model configured to categorize and/or classify different inputs, in various embodiments.

For example, in various embodiments, ML model 202 could be a recurrent neural network (RNN), a convolutional neural network (CNN), a deep neural network (DNN), a deep convolutional network (DCN), a deep belief network (DBN), a generative adversarial network (GAN), a self-organizing map (SOM), or any other technically feasible type of unsupervised neural network. In various embodiments, ML model 202 could implement K-means clustering, principle component analysis (PCA), and/or Word2Vec, among other functions implemented by artificial neural networks. In various embodiments, ML model 202 could include one or more relevance vector machines (RVMs), restricted Boltzmann machine (RBMs), long-short-term memory (LSTM) units, gated recurrent units (GRUs), hidden Markov model, autoencoders, denoising autoencoders, and/or variational autoencoders.

ML engine 200 can implement any technically feasible approach to generating and training ML model 202, according to various embodiments. For example, in one embodiment, ML engine 200 could generate an initial recurrent neural network for ML model 202 and then train that model, based on training vectors 142, using a gradient-descent or backpropagation training algorithm. As mentioned above in conjunction with FIG. 1, training vectors 142 may characterize specific programming patterns known to cause vulnerabilities to fault injection attacks, in one embodiment. In this embodiment, once trained based on training vectors 142, ML model 202 can be applied to detect vulnerabilities to fault injection attacks in computer code. ML engine 200 generally trains ML model 202, at least in part, prior to analyzing code 144 for vulnerabilities, in various embodiments.

In one embodiment, topology engine 210 is a software module configured to analyze the structure and function of code 144 in order to generate topology 212. Topology 212 is an abstract representation of code 144 that describes at least one of a control flow associated with code 144 and a data flow associated with code 144. A control flow associated with code 144 represents a set of conditional and/or branching statements associated with code 144. A data flow associated with code 144 describes data that is processed and/or transformed during execution of code 144. Topology engine 210 can generate topology 212 using a wide variety of techniques. In one embodiment topology engine 210 performs a static analysis of code 144 to generate topology 212. An example of how topology engine 210 can generate topology 212 is described below in conjunction with FIG. 3.

In one embodiment, vulnerability engine 220 evaluates topology 212 based on ML model 202 to detect a set of vulnerabilities 222 where fault injection attacks potentially can bypass security procedures. In another embodiment, vulnerability engine 220 generates a set of feature vectors based on topology 220 and then classifies these feature vectors using ML model 202. In so doing, vulnerability engine 212 may determine a degree to which a fault injection vulnerability potentially exists for each feature vector. In some embodiments, vulnerability engine 220 may attempt to detect vulnerabilities using an initial version of ML model 202 that may not accurately classify feature vectors. However, after ML model 202 is further trained, the accuracy with which ML model 202 detects vulnerabilities may improve. In another embodiment, vulnerability engine 220 identifies, based on a pattern analysis, portions of topology 212, where control flow could be disrupted or cryptologic primitives could be corrupted to bypass security procedures.

Vulnerability engine 220 generates vulnerability report 146 based on vulnerabilities 222 to indicate specific portions of code 144 that should be modified to mitigate fault injection attacks, according to one embodiment. In another embodiment, vulnerability report 146 specifies remediations that should be applied to each portion of code 144 in need of modification. The generation of vulnerability report 146 can occur before or after the operation of fault engine 230, according to various embodiments. An example of how vulnerability engine 220 detects a vulnerability within code 144 based on topology 212 is described in greater detail below in conjunction with FIG. 4.

In one embodiment, fault engine 230 tests vulnerabilities 222 to determine whether fault injection attacks do indeed allow security procedures to be bypassed, thereby confirming the presence of those vulnerabilities. In one embodiment, for a given vulnerability 222 identified within topology 212 and corresponding to a specific portion of code 144, fault engine 230 executes the specific portion of code 144 and emulates a fault injection during execution. The fault injection could involve, in some embodiments, modifying the truth value of a conditional statement or modifying the value of a cryptologic primitive, among others. The fault injection could be generated, in some embodiments, using a brute-force approach to generating training data known in the art as "fuzzing." In one embodiment, if the flow of control of code 144 proceeds in an unexpected manner, or specific data processed by code 144 assumes unexpected values, then fault engine 230 confirms the presence of the given vulnerability 222, in one embodiment. In some embodiments, fault engine 230 confirms vulnerabilities 222 prior to vulnerability engine 220 generating vulnerability report 146.

In one embodiment, upon confirming the presence of one or more vulnerabilities 222, fault engine 230 generates one or more training vectors 232. A given training vector 232 characterizes a programming pattern associated with a vulnerable portion of code 144 based on a corresponding portion of topology 212. In embodiments where vulnerability engine 220 generates feature vectors based on topology 212, as described above, fault engine 230 may include some or all of those feature vectors within training vectors 232. Because topology 212 is an abstract representation of code 144, training vectors 232 generated based on topology 212 generically characterize programming patterns that may cause vulnerabilities to attacks. In one embodiment, ML engine 200 can then train ML model 202 based on the newly generated training vectors 232 in order to improve the detection capabilities of ML model 202, in some embodiments.

One advantage of the approach described above is that code analyzer 140 can automatically detect vulnerabilities to various types of attacks within code 144, thereby leading to more accurate and thorough vulnerability testing of large code bases. Another advantage is that the efficiency and accuracy with which code analyzer 140 detects vulnerabilities improves over time with additionally generated learning vectors.

Example Generation of Computer Code Topology

As mentioned above in conjunction with FIG. 2, in various embodiments, topology generator 210 can implement any technically feasible approach to generating topology 212. Generally, topology 212 is an abstract topological representation of code 144 that delineates the flow of control and/or data during execution of code 144.

Figure 3:
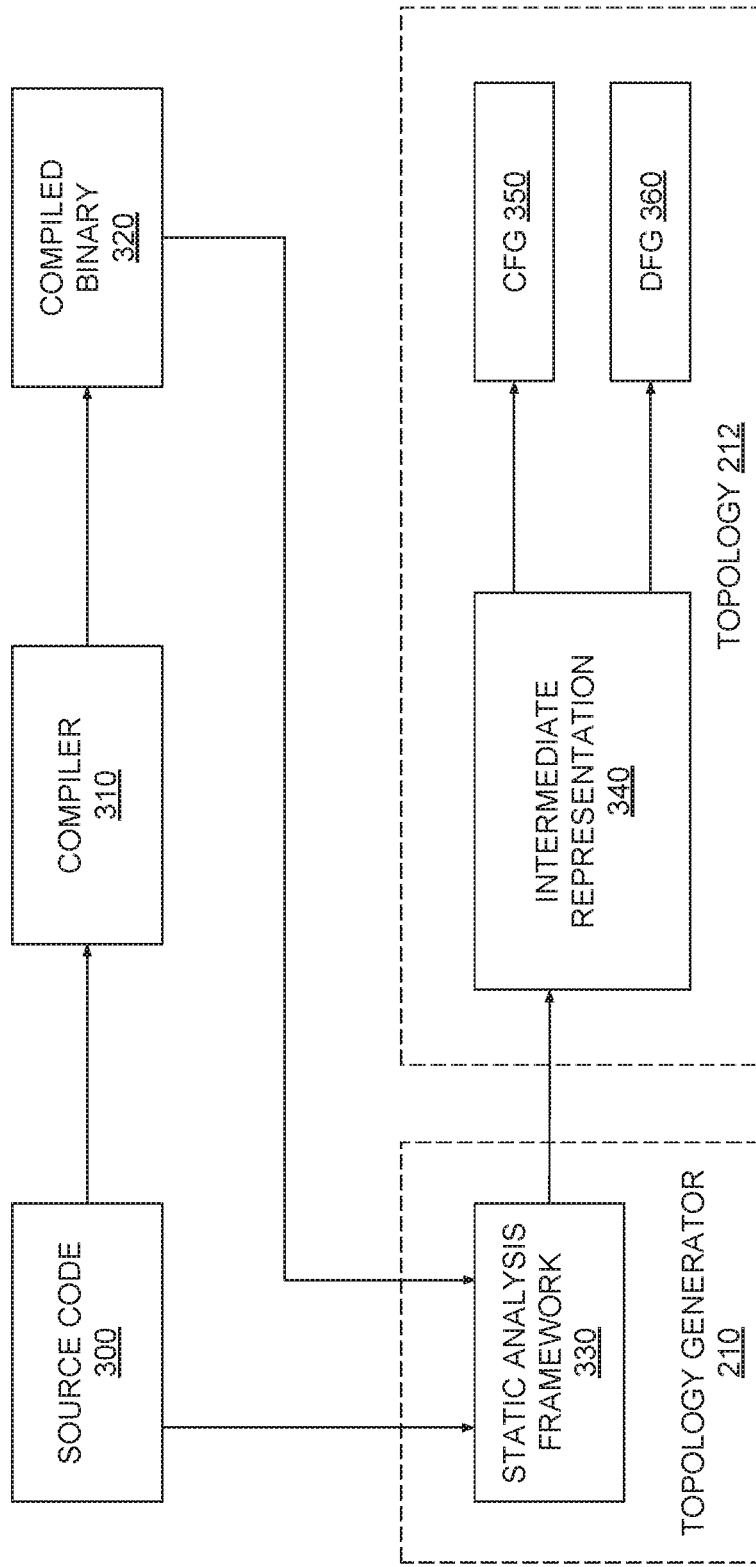
FIG. 3 illustrates an example of how the topology generator of FIG. 2 generates a topology, according to various embodiments.

FIG. 3 illustrates an example of how the topology generator of FIG. 2 generates a topology, according to various embodiments. As shown, in various embodiments, topology generator 210 can generate topology 212 based on either source code 300 or compiled binary 320, either (or both) of which may be included in code 144. Compiler 310 generates compiled binary 320 based on source code 300. In one embodiment, topology generator 210 includes a static analysis framework 330 configured to generate an intermediate representation 340 based on source code 300 and/or compiled binary 320.

Based on intermediate representation 340, topology generator 210 may generate a control flow graph (CFG) 350 and data flow graph (DFG) 360, according to various embodiments. CFG 350 describes the flow of control during execution of source code 300 and/or compiled binary 320, including, for example, one or more branches. DFG 360 describes the flow of data, including, for example, cryptologic primitives and transformations applied thereto during execution of source code 300 and/or compiled binary 320. Persons skilled in the art will understand that topology 212 can include any technically feasible form of abstraction that represents computer code in addition to those shown, including a set of basic blocks, an abstract syntax tree, and so forth.

One advantage of generating topology 212 based on either source code 300 or compiled binary 320 is that the developer of a given software or firmware application can provide either one of these forms or code. For example, the developer could provide one or more independent portions of source code 300 and avoid providing all of source code 300. Accordingly, if the source code for a given application (or any portions thereof) is confidential or otherwise unavailable, code analyzer 140 can still, in some embodiments, detect vulnerabilities based on other portions of that source code and/or the associated compiled binary.

One advantage of analyzing code 144 based on topology 212 is that code 144 may include hardware-specific constructs that could potentially interfere with the ability of vulnerability engine 220 to detect vulnerabilities to fault injection attacks. However, topology 212 is abstract and hardware-agnostic, so the detection of vulnerabilities may be significantly easier compared to a direct analysis of code 144. In addition, training ML model 202 based on training vectors 232 derived from topology 212 produces an ML model 202 that is generally applicable to many different types of code. An example of how vulnerabilities can be detected based on topology 212 is set forth below in conjunction with FIG. 4.

Example Detection of Vulnerability

Figure 4:
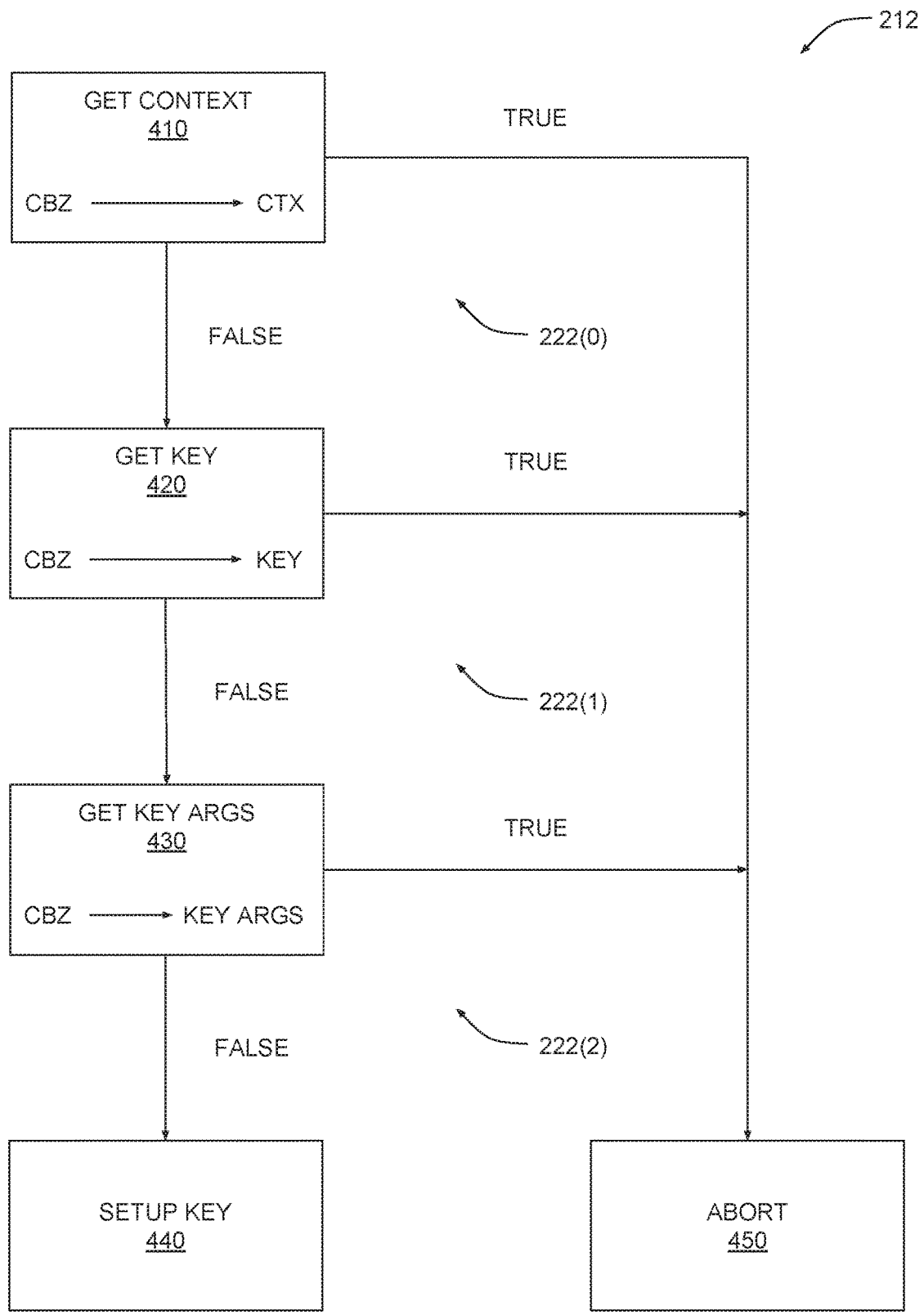
FIG. 4 illustrates an example topology that indicates various vulnerabilities to fault injection attacks, according to various embodiments.

FIG. 4 illustrates an example topology that indicates various vulnerabilities to fault injection attacks, according to various embodiments. In the embodiment shown, topology 212 includes several operations associated with a security procedure. Specifically, topology 212 includes get context 410, get key 420, get key arguments (args) 430, setup key 440, and abort 450. The flow of control can take different branches following certain steps based on the result of a compare by zero (CBZ) operation.

As is shown, get context 410 obtains a context value (CTX) and then implements a CBZ operation to determine whether the obtained context value equates to zero. If the CBZ operation evaluates to true, then control flow proceeds to abort 450 and the security procedure is aborted. However, if the CBZ operation evaluates to false, then the security procedure proceeds to get key 420.

Get key 420 obtains a key value and then implements a CBZ operation to determine whether the obtained key value equates to zero. If the CBZ operation evaluates to true, then control flow proceeds to abort 450 and the security procedure is aborted. However, if the CBZ operation evaluates to false, then the security procedure proceeds to get key args 430.

Get key args 430 obtains key arguments and then implements a CBZ operation to determine whether the obtained key arguments equate to zero. If the CBZ operation evaluates to true, then control flow proceeds to abort 450 and the security procedure is aborted. However, if the CBZ operation evaluates to false, then the security procedure proceeds to setup key 440, where the security procedure completes successfully.

In some embodiments, vulnerability engine 220 can detect various vulnerabilities 222 to attacks by evaluating topology 212 using ML model 202. For example, in one embodiment, vulnerability engine 220 could detect vulnerability 222(0) by determining that a type of attack known as "glitching" could disrupt the CBZ operation performed by get context 410, causing control flow to proceed to get key 420 even if the context value does not load properly. In another embodiment, vulnerability engine 220 could also detect vulnerability 222(1) by determining that a glitching attack could disrupt the CBZ operation performed by get key 420, causing control flow to proceed to get key args 430 even if the key value does not load properly. In yet another embodiment, vulnerability engine 220 could further detect vulnerability 222(2) by determining that a glitching attack could disrupt the CBZ operation performed by get key args 430, causing control flow to proceed to setup key 440 even if the key arguments do not load properly.

In some embodiments, once vulnerability engine 220 identifies vulnerabilities associated with specific portions of topology 212 in the manner described, fault engine 230 confirms these vulnerabilities via emulated fault injection. Fault engine 230 then generates training vectors 232 that characterize vulnerable programming patterns based on the specific portions of topology 212 associated with the identified vulnerabilities. For example, fault engine 230 could generate training vectors 232 based on get context 410, get key 420, and/or get key args 430 in order to characterize programming patterns that cause vulnerabilities 222(0), 222(1), and/or 222(2), respectively, according to various embodiments. In one embodiment, ML engine 200 then trains ML model 202 based on these training vectors, allowing ML model 202 to more effectively detect vulnerabilities in code. The various techniques described above in conjunction with FIGS. 1-4 are also described below in conjunction with FIG. 5.

Procedure for Detecting Vulnerabilities in Code

Figure 5:
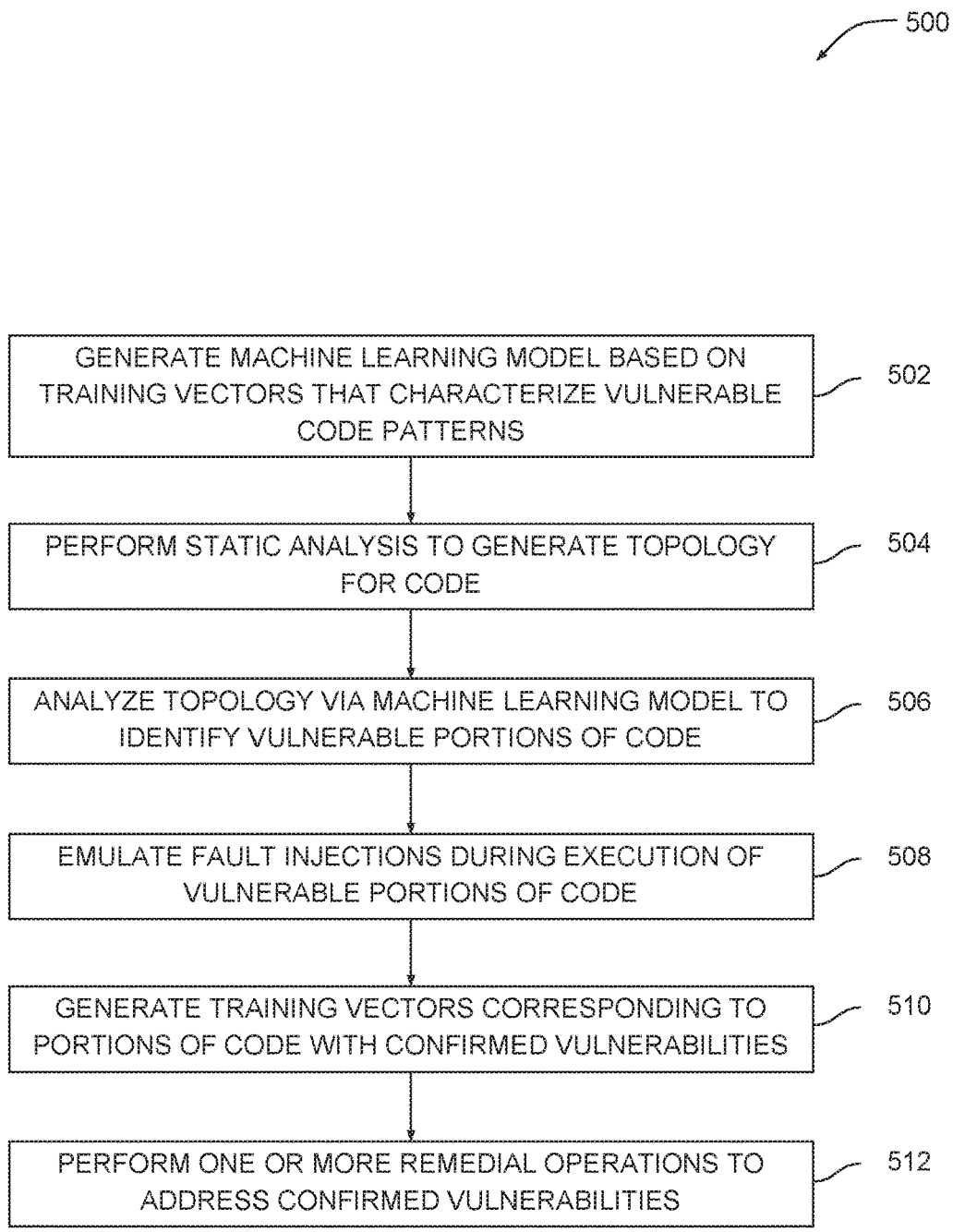
FIG. 5 is a flow diagram of method steps for detecting a vulnerability to a fault injection attack within a portion of code, according to various embodiments.

FIG. 5 is a flow diagram of method steps for detecting a vulnerability to a fault injection attack within a portion of code, according to various embodiments. Although the method steps are described in conjunction with the systems of FIGS. 1-4, persons skilled in the art will understand that any system configured to perform the method steps in any order falls within the scope of the present embodiments.

As shown, a method 500 begins at step 502, where ML engine 200 within code analyzer 140 generates a machine learning model based on training vectors 142. In various embodiments, training vectors 142 characterize vulnerable code patterns derived from previously analyzed code and/or include portions of topologies generated based on the previously analyzed code. In such embodiments, training vectors 142 may be generated by the various engines within code analyzer 140. For example, topology generator 210 could generate sets of topologies corresponding to the aforementioned code. Vulnerability engine 220 could identify the potential vulnerabilities based on an initial version of ML model 202. Fault engine 230 could then confirm a subset of these vulnerabilities to generate training vectors 142. ML engine 200 would then train ML model 202 based on these training vectors, thereby improving the accuracy with which vulnerability engine 220 can detect vulnerabilities. Via this iterative process, code analyzer 140 can automatically train ML model 202 to detect vulnerabilities, according to various embodiments.

At step 504, topology generator 210 within code analyzer 140 performs a static analysis to generate a topology for the code. The code may include source code associated with a software application or firmware application. Alternatively, the code may include a compiled binary generated based on the software application or firmware application. According to various embodiments, topology generator 210 can also perform the static analysis based on source code or a corresponding compiled binary. The topology generated for given code includes a topological representation of the code that describes at least one of a control flow or a data flow. For example, in one embodiment, the topology could include an intermediate representation, an abstract syntax tree, a control flow graph, or a data flow graph, among other types of representations.

At step 506, vulnerability engine 220 analyzes the topology via an ML model to identify vulnerable portions of code. In some embodiments, the ML model can identify vulnerable code patterns based on topologies by virtue of being trained at step 502 with training vectors 142, in some embodiments. In one embodiment, vulnerability engine 220 may generate a set of feature vectors representing different portions of the topology generated at step 504. For example, vulnerability engine 220 could generate a feature vector to represent a conditional statement included in the topology. Vulnerability engine 220 may then evaluate the feature vectors using the ML model to identify those feature vectors that are classified as potentially including vulnerabilities.

At step 508, fault engine 230 executes portions of code associated with the potential vulnerabilities identified at step 506 and emulates fault injections in conjunction with the execution of those portions of code. Fault engine 230 confirms vulnerabilities depending on whether the execution of those portions of code is disrupted. For example, fault engine 230 could confirm a vulnerability within a given portion of code when the flow of control proceeds in an unexpected manner during execution of the given portion of code. In one embodiment, fault engine 230 could also confirm a vulnerability within the given portion of code when data processed by the given portion of code assumes unexpected values during execution of the given portion of code.

At step 510, fault engine 230 generates training vectors corresponding to portions of code with confirmed vulnerabilities. In particular, fault engine 230 extracts portions of the topology corresponding to portions of the code where vulnerabilities were confirmed at step 508. Fault engine 230 then generates training vectors based on, or including, those portions of the topology. In embodiments where vulnerability engine 220 generates feature vectors during step 506, fault engine 230 may derive the training vectors from these feature vectors. ML engine 200 can then update the ML model generated at step 502 based on these training vectors, thereby continuously improving the ML model each time code is analyzed for vulnerabilities.

At step 512, vulnerability engine 220 performs one or more remedial operations to address the vulnerabilities confirmed at step 510. For example, vulnerability engine 220 could generate a vulnerability report outlining the identified vulnerabilities and indicating remediations to the vulnerable portions of code. In some embodiments, ML engine 200 may train the ML model to output specific remediations that should be applied for each different type of identifiable vulnerability. Via the method 500, code analyzer 140 can analyze large amounts of code very quickly and thoroughly in order to detect portions of code where attacks can potentially exploit vulnerabilities, according to various embodiments. These vulnerabilities can then be mitigated in order to produce secure code that is more robust against fault injection attacks, including glitching attacks, among others.

In sum, various embodiments include a code analyzer that implements machine learning to detect vulnerabilities in computer code. In one embodiment, the code analyzer trains a machine learning model using training vectors that characterize vulnerable programming patterns. The code analyzer evaluates a topological representation of the computer code using the machine learning model to identify a potential vulnerability. The potential vulnerability corresponds to a portion of the computer code where an attack can be used to bypass a security procedure. The code analyzer tests the potential vulnerability by emulating a fault injection during execution of the portion of the computer code. Upon confirming that the potential vulnerability can be exploited via a fault injection, the code analyzer generates a training vector that characterizes a vulnerable programming pattern associated with the portion of the computer code. The training vector can be used to further train the machine learning model. In this manner, the code analyzer can identify vulnerabilities in computer code using the machine learning model while also training the machine learning model to better detect such vulnerabilities.

At least one technological advantage of the disclosed techniques is that vulnerabilities to attacks can be automatically detected in computer code with greater effectiveness compared to conventional approaches. Another technological advantage of the disclosed techniques is that a machine learning model trained to detect such vulnerabilities becomes more effective at detecting vulnerabilities over time. Yet another technological advantage of the disclosed techniques is that reliance on manual approaches to detecting vulnerabilities via visual inspection of code can be reduced or eliminated. These technological advantages represent multiple technological advancements relative to prior art approaches.

1. Some embodiments include a computer-implemented method, the method comprising generating a first machine learning model based on a first set of training data associated with a first type of vulnerability, generating a topology based on a first portion of code, wherein the topology comprises at least one of a control flow associated with the first portion of code or a data flow associated with the first portion of code, analyzing the topology based on the first machine learning model to determine that the first portion of code includes the first type of vulnerability, and performing one or more remedial operations in response to determining that the first portion of code includes the first type of vulnerability.

2. The computer-implemented method of clause 1, further comprising generating a second set of training data based on the topology, and updating the first machine learning model based on the second set of training data.

3. The computer-implemented method of any of clauses 1-2, wherein generating the second set of training data comprises executing the first portion of code, during execution of the first portion of code, emulating a fault injection, determining, based on the execution of the first portion of code after to the fault injection, that the first portion of the code includes the first type of vulnerability, determining a first portion of the topology that corresponds to the first portion of code, and generating a first training vector included in the second set of training data based on the first portion of the topology.

4. The computer-implemented method of any of clauses 1-3, wherein generating the topology comprises performing a static analysis on the first portion of code to generate a control flow graph, wherein the control flow graph indicates at least one conditional branch that depends on a value of a cryptologic primitive.

5. The computer-implemented method of any of clauses 1-4, wherein generating the topology comprises performing a static analysis on the first portion of code to generate a data flow graph, wherein the data flow graph indicates a transformation associated with a value of a cryptologic primitive.

6. The computer-implemented method of any of clauses 1-5, wherein generating the topology comprises performing a static analysis on the first portion of code to generate an abstract syntax tree.

7. The computer-implemented method of any of clauses 1-6, wherein analyzing the topology comprises assigning a first classification to a first portion of the topology that is associated with the first type of vulnerability, wherein the first portion of the topology corresponds to the first portion of code.

8. The computer-implemented method of any of clauses 1-7, wherein performing the one or more remedial operations comprises generating a report indicating that the first portion of code includes the first vulnerability.

9. The computer-implemented method of any of clauses 1-8, wherein performing the one or more remedial operations comprises generating a report indicating a first vulnerability mitigation that should be applied to the first portion of code.

10. The computer-implemented method of any of clauses 1-9, wherein the first portion of code comprises source code associated with a software application or source code associated with a firmware application.

11. Some embodiments include a non-transitory computer-readable medium storing program instructions that, when executed by at least one processor, cause the at least one processor to at least generate a first machine learning model based on a first set of training data associated with a first type of vulnerability, generate a topology based on a first portion of code, wherein the topology comprises at least one of a control flow associated with the first portion of code or a data flow associated with the first portion of code, analyze the topology based on the first machine learning model to determine that the first portion of code includes the first type of vulnerability, and perform one or more remedial operations in response to determining that the first portion of code includes the first type of vulnerability.

12. The non-transitory computer-readable medium of clause 11, further comprising program instructions to cause the processor to generate a second set of training data based on the topology, and update the first machine learning model based on the second set of training data.

13. The non-transitory computer-readable medium of any of clauses 11-12, wherein the processor executes the program instructions when generating the second set of training data to execute the first portion of code, during execution of the first portion of code, emulate a fault injection, determine, based on the execution of the first portion of code after to the fault injection, that the first portion of the code includes the first type of vulnerability, determine a first portion of the topology that corresponds to the first portion of code, and generate a first training vector included in the second set of training data based on the first portion of the topology.

14. The non-transitory computer-readable medium of any of clauses 11-13, wherein the processor executes the program instructions when generating the topology to perform a static analysis on the first portion of code to generate a control flow graph, wherein the control flow graph indicates at least one conditional branch that depends on a value of a cryptologic primitive.

15. The non-transitory computer-readable medium of any of clauses 11-14, wherein the processor executes the program instructions when generating the topology to perform a static analysis on the first portion of code to generate a data flow graph, wherein the data flow graph indicates a transformation associated with a value of a cryptologic primitive.

16. Some embodiments include a system, comprising a memory storing one or more instructions, and a processor that executes the instructions to at least generate a first machine learning model based on a first set of training data associated with a first type of vulnerability, generate a topology based on a first portion of code, wherein the topology comprises at least one of a control flow associated with the first portion of code or a data flow associated with the first portion of code, analyze the topology based on the first machine learning model to determine that the first portion of code includes the first type of vulnerability, and perform one or more remedial operations in response to determining that the first portion of code includes the first type of vulnerability.

17. The system of clause 16, wherein the processor executes the instructions when performing the one or more remedial operations to generate a report indicating that the first portion of code includes the first vulnerability or generating a report indicating a first vulnerability mitigation that should be applied to the first portion of code.

18. The system of any of clauses 16-17, wherein the first portion of code comprises source code associated with a software application or source code associated with a firmware application.

19. The system of any of clauses 16-18, wherein the first portion of code comprises a compiled binary generated by compiling source code associated with a software application or compiling source code associated with a firmware application.

20. The system of any of clauses 16-19, wherein the machine learning model comprises a recurrent neural network trained via one or more unsupervised training algorithms with the first set of training data.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more processors comprising:
   circuitry to use one or more neural networks to identify, based, at least in part on a graph topology indicating one or more conditional branches that are dependent on one or more cryptologic primitives of a software program, one or more vulnerabilities to a fault injection attack at a physical layer of a computer system to perform the software program, wherein the fault injection attack is to cause the one or more cryptologic primitives to be corrupted or one or more security procedures to be bypassed.

2. The one or more processors of claim 1, wherein code of the software program is used to generate the graph topology, the graph topology comprising at least one of a control flow associated with the code or a data flow associated with the code.

3. The one or more processors of claim 2, wherein the graph topology is generated, at least in part, by performing a static analysis on the code to generate at least one of:
   a control flow graph, the control flow graph indicating at least one conditional branch that depends on a value of the one or more cryptologic primitives;
   a data flow graph, the data flow graph indicating a transformation associated with a value of the one or more cryptologic primitives; or
   an abstract syntax tree.

4. The one or more processors of claim 2, wherein:
   the one or more vulnerabilities is identified at least in part by applying the one or more neural networks to the graph topology;
   a set of training data is generated based, at least in part, on the graph topology;
   the one or more neural networks is updated based at least in part on the set of training data; and
   the circuitry is to further cause one or more remedial operations to be performed.

5. The one or more processors of claim 4, wherein the one or more remedial operations comprises generating a report indicating at least one of:
   a vulnerability mitigation that should be applied to a portion of code; or
   that a portion of the code includes the one or more vulnerabilities.

6. The one or more processors of claim 2, wherein the circuitry to use the one or more neural networks to identify the one or more vulnerabilities to the fault injection attack within the software program includes:
   further circuitry to, as a result of a fault injection being emulated during an execution of a portion of code of the software program, confirm the one or more vulnerabilities to the fault injection attack in the code; and
   determine a portion of the graph topology corresponding to the confirmed one or more vulnerabilities to the fault injection attack based on the execution of the portion of the code.

7. The one or more processors of claim 6, wherein the one or more neural networks are updated based at least in part on a training vector that includes the portion of the graph topology.

8. The one or more processors of claim 6, wherein:
   one or more programming patterns in the portion of the code are identified based at least in part on the confirmed one or more vulnerabilities to the fault injection attack; and
   the one or more neural networks are updated based on information indicating the one or more programming patterns that resulted in the one or more vulnerabilities to the fault injection attack.

9. The one or more processors of claim 1, wherein the graph topology corresponds to source code associated with a software application or source code associated with a firmware application.

10. The one or more processors of claim 1, wherein the fault injection attack is to cause the security procedure to be bypassed.

11. The one or more processors of claim 10, wherein the security procedure to be bypassed is an authentication routine where an identity of a user is established.

12. The one or more processors of claim 1, wherein the one or more vulnerabilities:
   correspond to a portion of code of the software program where the security procedure could be bypassed if the fault injection attack is implemented.

13. The one or more processors of claim 1, wherein the graph topology includes a control flow graph and a data flow graph that specify one or more dependencies within the software program.

14. The one or more processors of claim 1, wherein the fault injection attack includes modifying an operating voltage to a hardware component in the computer system to induce errors in the operation of the computer system.

15. The one or more processors of claim 1, wherein one or more feature vectors are generated from the graph topology subsequent to the one or more vulnerabilities to the fault injection attack being identified.

16. A non-transitory computer-readable storage medium storing program instructions that, when executed by one or more processors, cause one or more processors to at least:
use one or more neural networks to identify, based, at least in part on graph topology indicating one or more conditional branches that are dependent on one or more cryptologic primitives of a software program, one or more vulnerabilities to a fault injection attack at a physical layer of a computer system to perform the software program, wherein the fault injection attack is to cause the one or more cryptologic primitives to be corrupted or one or more security procedures to be bypassed.

17. The non-transitory computer-readable storage medium of claim 16, further comprising storing further program instructions to cause the one or more processors to at least:
generate the graph topology based at least in part on a portion of code of the software program;
as a result of the one or more vulnerabilities to the fault injection attack being identified with the software program, cause one or more remedial actions to be performed; and
wherein:
the graph topology comprises at least one of a control flow associated with the portion of code or a data flow associated with the portion of code; and
the one or more vulnerabilities to the fault injection attack are identified by applying the one or more neural networks to the graph topology.

18. The non-transitory computer-readable storage medium of claim 17, wherein the one or more processors further execute the program instructions to at least generate the graph topology to perform a static analysis on the portion of code to generate at least one of:
a control flow graph, wherein the control flow graph indicates at least one conditional branch that depends on a value of a cryptologic primitive; or
a data flow graph, wherein the data flow graph indicates a transformation associated with a value of the one or more cryptologic primitives.

19. The non-transitory computer-readable storage medium of claim 16, further storing further program instructions to cause the one or more processors to at least:
generate a set of training data based on the graph topology; and update the one or more neural networks based, at least in part, on the set of training data.

20. The non-transitory computer-readable storage medium of claim 19, wherein the one or more processors execute the program instructions when generating the set of training data to at least:
execute a portion of code of the software program;
during execution of the portion of code of the software program, emulate a fault injection;
determine, based on the execution of the portion of code of the software program after the fault injection, that the portion of the code of the software program includes the one or more vulnerabilities to the fault injection attack; and
determine a portion of the graph topology that corresponds to the portion of code; and generate a training vector that is included in the set of training data based on the portion of the graph topology.

21. The non-transitory computer-readable storage medium of claim 16, wherein causing the one or more processors to at least use the one or more neural networks to identify the one or more vulnerabilities to the fault injection attack within the software program includes causing the one or more processors to at least:
perform static analysis to generate the graph topology of a portion of code of the software program;
analyze the graph topology using the one or more neural networks to identify one or more vulnerable portions of code in the software program;
emulate a fault injection during execution of the one or more vulnerable portions of code to verify the one or more vulnerabilities in the one or more vulnerable portions of code; and
generate one or more training vectors corresponding to the one or more vulnerable portions of code with confirmed vulnerabilities.

22. A system, comprising:
a memory storing one or more instructions; and
one or more processors that execute the one or more instructions to at least:
use one or more neural networks to identify, based, at least in part on a graph topology that indicates one or more conditional branches that are dependent on one or more cryptologic primitives of a software program, one or more vulnerabilities to a fault injection attack at a physical layer of a computer system to perform the software program, wherein the fault injection attack is to cause the one or more cryptologic primitives to be corrupted or one or more security procedures to be bypassed.

23. The system of claim 22, wherein the one or more processors further executes the one or more instructions to at least:
use a static analysis of code of the software program to generate the graph topology, wherein the graph topology comprises at least one of a control flow associated with the code or a data flow associated with the code;
perform one or more remedial operations in response to the identification of the one or more vulnerabilities to the fault injection attack; and
wherein the one or more vulnerabilities to the fault injection attack are identified at least in part by applying the one or more neural networks to the graph topology.

24. The system of claim 23, wherein the one or more processors execute the instructions when performing the one or more remedial operations to generate a report indicating at least that a portion of the code includes the one or more vulnerabilities, or generating a report indicating a vulnerability mitigation that should be applied to a portion of the code.

25. The system of claim 23, wherein the code of the software program comprises;
source code associated with a software application;
source code associated with a firmware application;
a compiled binary generated by compiling source code associated with a software application; or
a compiled source code associated with a firmware application.

26. The system of claim 22, wherein the one or more neural networks comprise a recurrent neural network trained via one or more unsupervised training algorithms with a set of training data that includes information indicating one or more program behaviors resulting from a specific vulnerability to the fault injection attack.

* * * * *